US006442646B1

(12) United States Patent
Tsuruta

(10) Patent No.: US 6,442,646 B1
(45) Date of Patent: Aug. 27, 2002

(54) FIRST-IN-FIRST-OUT (FIFO) MEMORY DEVICE FOR INPUTTING/OUTPUTTING DATA WITH VARIABLE LENGTHS

(75) Inventor: Hideyo Tsuruta, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/050,107

(22) Filed: Mar. 30, 1998

(30) Foreign Application Priority Data

Apr. 2, 1997 (JP) ............................................ 9-083615

(51) Int. Cl.[7] .............................................. G06F 12/00
(52) U.S. Cl. ........................................ 711/109; 711/201
(58) Field of Search ............................... 711/170, 109, 711/110, 201; 365/221, 219

(56) References Cited

U.S. PATENT DOCUMENTS

| 5,168,561 A | | 12/1992 | Vo ................................ 710/22 |
| 5,278,956 A | * | 1/1994 | Thomsen et al. ............ 711/167 |
| 5,315,696 A | * | 5/1994 | Case et al. .................... 345/433 |
| 5,359,568 A | * | 10/1994 | Livay et al. .................. 365/221 |
| 5,517,627 A | * | 5/1996 | Petersen ....................... 710/131 |
| 5,572,148 A | * | 11/1996 | Lytle et al. ..................... 326/41 |
| 5,673,396 A | * | 9/1997 | Smolansky et al. .......... 710/127 |
| 5,841,722 A | * | 11/1998 | Willenz ......................... 365/221 |
| 5,917,506 A | * | 6/1999 | Hsu .............................. 345/525 |
| 6,065,070 A | * | 5/2000 | Johnson ......................... 710/22 |

FOREIGN PATENT DOCUMENTS

WO    WO 95/06285    3/1995

OTHER PUBLICATIONS

"High Performance FIFO Memories Data Book", Texas Instruments, pp. 2–2 thru 2–25, Sep. 1994.*
"BiCMOS CMOS Data Book" Cypress Semiconductor, pp. 5–84 thru 5–104, Mar. 1, 1992.*

* cited by examiner

Primary Examiner—Hong Kim
(74) Attorney, Agent, or Firm—Akin, Gump, Strauss, Hauer & Feld, L.L.P.

(57) ABSTRACT

A FIFO memory device for inputting/outputting data having variable lengths of the present invention, includes: a first holding portion for holding data having a maximum data length MAX of input data to be input to the FIFO memory device; a second holding portion for holding residue data having a data length shorter than the maximum data length; and an input selecting portion for selectively inputting the input data to the first holding portion and the second holding portion in accordance with a data length IBP of the residue data and a data length WB of the input data.

4 Claims, 4 Drawing Sheets

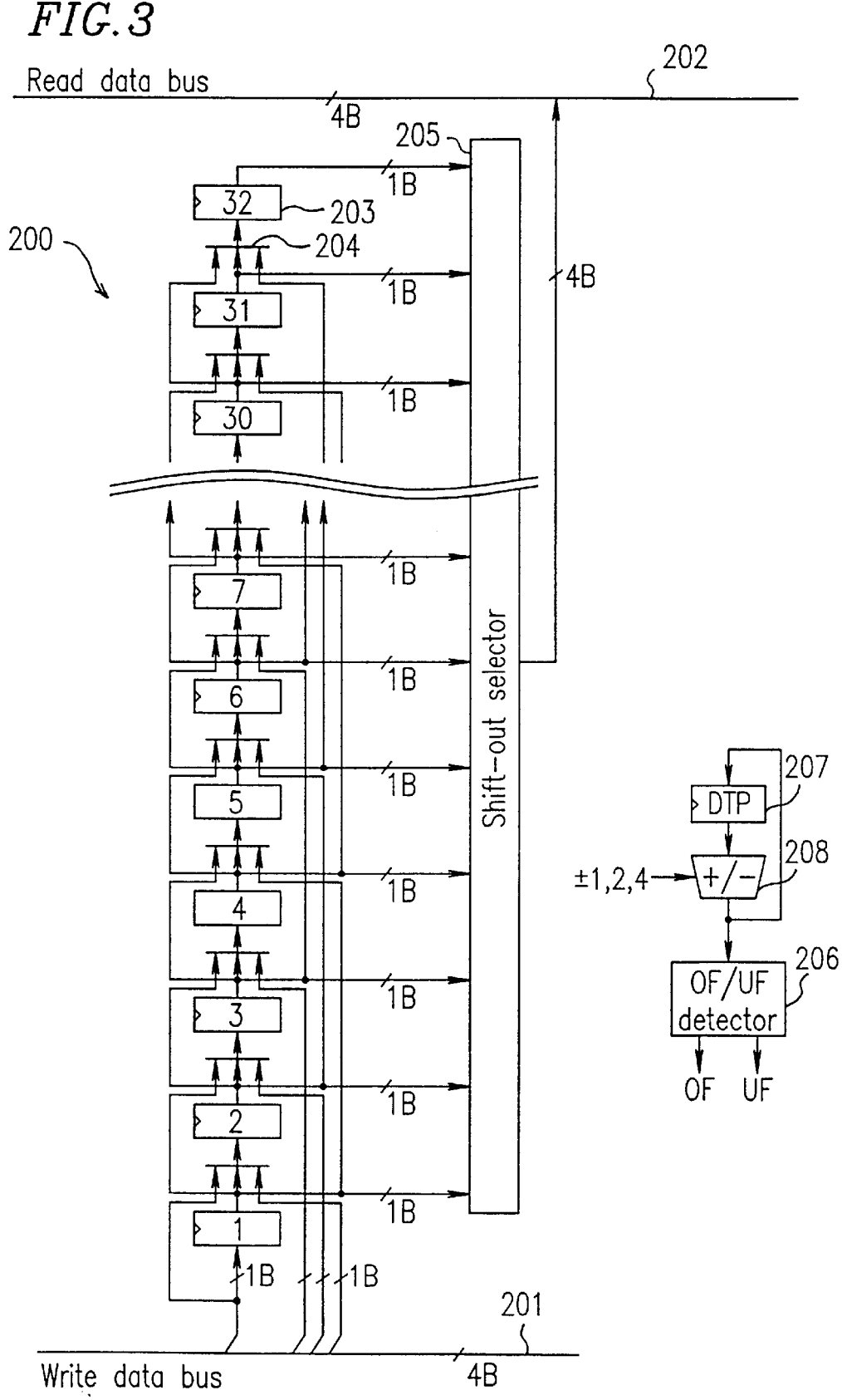
FIG.3 *PRIOR ART*

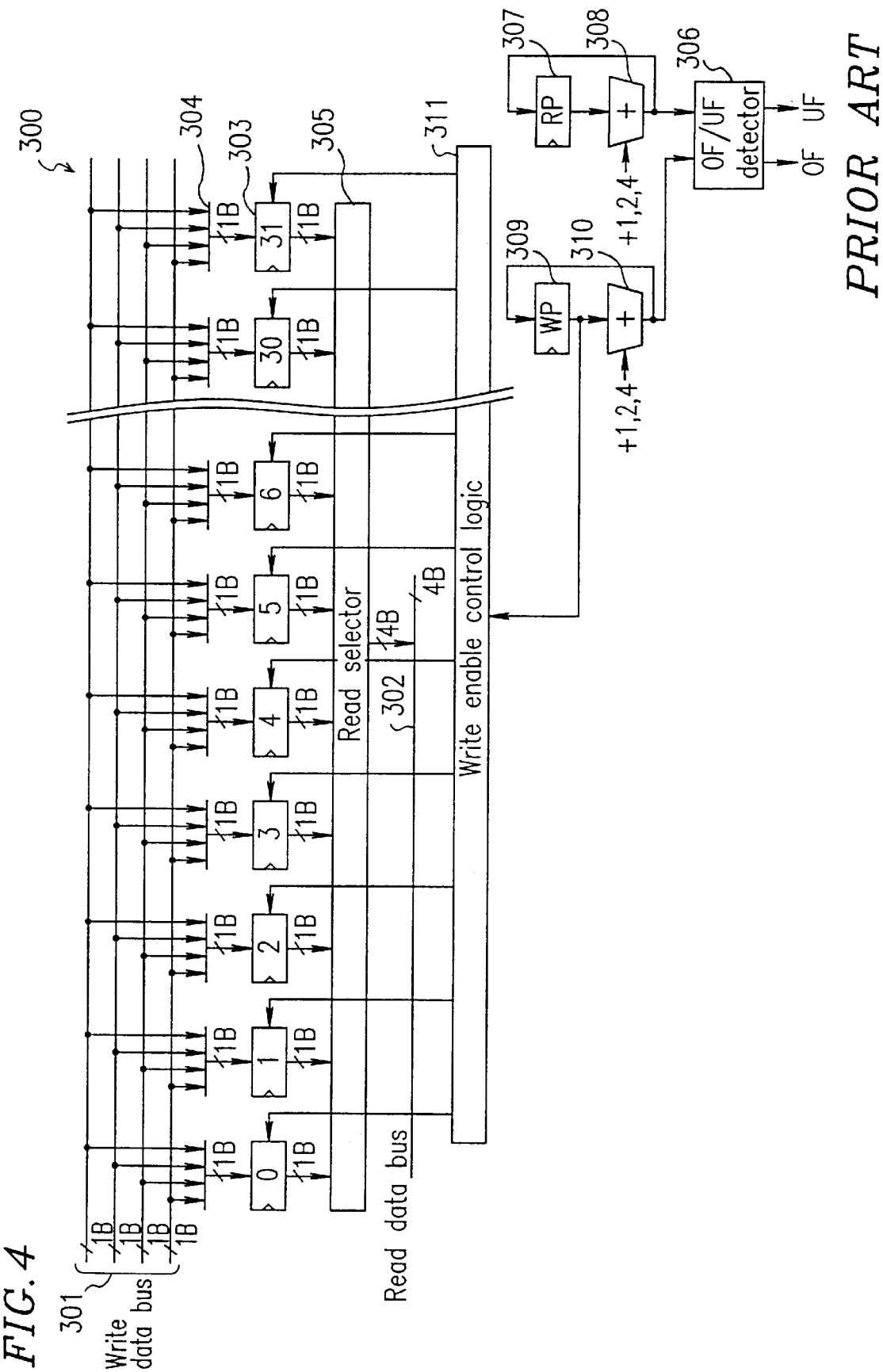

FIRST-IN-FIRST-OUT (FIFO) MEMORY DEVICE FOR INPUTTING/OUTPUTTING DATA WITH VARIABLE LENGTHS

BACKGROUND OF THE INVENTION

1. Field of the Invention

The present invention relates to a first-in first-out memory device for temporarily accumulating transfer data in a data processing apparatus and a data transfer apparatus.

2. Description of the Related Art

In a data processing apparatus and a data transfer apparatus such as a microprocessor, a microcomputer, a DSP, and a communication controller, a first-in first-out buffer memory for temporality accumulating transfer data is used. With a first-in first-out (hereinafter, referred to as "FIFO") memory device, several configurations have been designed in the past. In the case where a data length of data to be written in a FIFO device is fixed, the FIFO device generally includes a shift register in which write unit registers are connected to each other. The circuit configuration and connecting wiring of the FIFO device using the shift register are simple. In the case where a data length of data to be written in a FIFO device is variable, the configuration of the FIFO device becomes complicated. In this case, the FIFO device is required to have a function of writing both data longer than a unit word length and data with a unit word length at a time.

In general, the support for the transfer of data with a plurality of word lengths is a function indispensable for a number of digital systems such as a computer. Therefore, a function of transferring data with a plurality of word lengths is also required of a FIFO device used in the digital system. Hereinafter, a conventional FIFO device having a function of transferring data with a plurality of word lengths will be described. The conventional FIFO described below is capable of transferring 1 byte, 2 bytes, and 4 bytes of data. The minimum unit to be written in the FIFO device is 1 byte. A transfer bus connected to the FIFO device is divided into a write bus and a read bus. The write bus is used for transferring data to be written in the FIFO device. The read bus is used for transferring data to be read from the FIFO device. The widths of the write bus and the read bus are respectively 4 bytes. As shown in Table 1, 1 byte of data, 2 bytes of data, and 4 bytes of data are arranged on a lower order side on the transfer bus. More specifically, the fourth byte is arranged on the highest order side and the first byte is arranged on the lowest order side.

TABLE 1

Arrangement of data on a transfer bus

| Data length/Byte position | 4th byte | 3rd byte | 2nd byte | 1st byte |
|---|---|---|---|---|
| 1 byte of data | — | — | — | B1 |
| 2 bytes of data | — | — | B2 | B1 |
| 4 bytes of data | B4 | B3 | B2 | B1 |

FIG. 3 shows a first exemplary configuration of a conventional FIFO device. A FIFO device 200 includes a shift register 203, write enable control logics 204, a shift-out selector 205, an overflow/underflow detector 206, a data top pointer 207, and a data top pointer increasing/decreasing unit 208. The FIFO device 200 is connected to a write data bus 201 and a read data bus 202.

Hereinafter, an operation of the FIFO device 200 will be described with reference to FIG. 3.

In the case where 1 byte of data is written in the FIFO device 200, 1 byte of data is transferred to the shift register 203 using a lower order side of the write data bus 201. One byte of data thus transferred is written in a 1-byte register 1 of the shift register 203. Before 1 byte of data is written in the 1-byte register 1, the entire shift register 203 is shifted up by 1 byte. More specifically, the write enable control logic 204 selects a central input, whereby each 1-byte register of the shifter register 203 receives data stored in the 1-byte register immediately below. When 1 byte of data is written in the FIFO device 200, the data top pointer increasing/decreasing unit 208 adds one to a value of the data top pointer 207.

In the case where 2 bytes of data are written in the FIFO device 200, 2 bytes of data are transferred to the shift register 203 using a lower order side of the write data bus 201. Two bytes of data thus transferred are written in 1-byte registers 1 and 2 of the shift register 203. Before 2 bytes of data are written in the 1-byte registers 1 and 2, the entire shift register 203 is shifted up by 2 bytes. More specifically, the write enable control logic 204 selects a left input, whereby each 1-byte register of the shifter register 203 receives data stored in two 1-byte registers below. When 2 bytes of data are written in the FIFO device 200, the data top pointer increasing/decreasing unit 208 adds two to a value of the data top pointer 207.

In the case where 4 bytes of data are written in the FIFO device 200, 4 bytes of data are transferred to the shift register 203 using the entire write data bus 201. Four bytes of data thus transferred are written in 1-byte registers 1, 2, 3, and 4 of the shift register 203. Before 4 bytes of data are written in the 1-byte registers 1, 2, 3, and 4, the entire shift register 203 is shifted up by 4 bytes. More specifically, the write enable control logic 204 selects a right input, whereby each 1-byte register of the shifter register 203 receives data stored in four 1-byte registers below. When 4 bytes of data are written in the FIFO device 200, the data top pointer increasing/decreasing unit 208 adds four to a value of the data top pointer 207.

In the case where data is read from the FIFO device 200, 1-byte registers are selected by the shift-out selector 205 in accordance with the number of bytes to be read. The number of bytes to be read from the FIFO device 200 is 1, 2, or 4. The 1-byte register selected by the shift-out selector 205 is placed lower than a position designated by the data top pointer 207. The data of the 1-byte register thus selected is transferred using a lower order side of the read data bus 202. A value of the data top pointer 207 is decreased by 1, 2, or 4 in accordance with the number of bytes of read data.

In the case where a value of the data top pointer 207 exceeds 32 by writing data in the FIFO device 200, the overflow/underflow detector 206 detects a FIFO overflow. In the case where a value of the data top pointer 207 becomes negative by reading data from the FIFO device 200, the overflow/underflow detector 206 detects a FIFO underflow. During the FIFO over-flow/underflow detection, reading/writing of data with respect to the FIFO device 200 is limited.

As described above, reading/writing of 1, 2, or 4 bytes of data with respect to the FIFO device 200 is performed. In the FIFO device 200, data with three different lengths is directly written in the shift register 203, so that each byte register requires three shift paths and a selector for selecting either of the three paths. Herein, three shift paths refer to a path for shifting data to a register immediately above, a path for shifting data to two registers above, and a path for shifting data to four registers above. In the case where the FIFO device 200 is mounted on a chip, three shift paths and a selector are required of each byte register, so that the circuit area of the FIFO device on the chip increases.

FIG. 4 shows a second exemplary configuration of a conventional FIFO device. A FIFO device 300 includes a byte register 303, write selectors 304, a read selector 305, an overflow/underflow detector 306, a read pointer 307, a read pointer increasing unit 308, a write pointer 309, a write pointer increasing unit 310, and a write enable control logic 311. The FIFO device 300 is connected to a write data bus 301 and a read data bus 302.

Hereinafter, an operation of the FIFO device 300 will be described with reference to FIG. 4.

In the case where data is written in the FIFO device 300, data is transferred using the write data bus 301. The data transferred from the write data bus 301 is input to all the write selectors 304. The write selectors 304 are each provided for each 1-byte register. Only the write selector 304 corresponding to a 1-byte register to which data is written operates during writing of data. The write selector 304 corresponding to a 1-byte register to which data is not written may not operate during writing of data. The leading 1 byte register to which data is written is determined based on a value held by the write pointer 309. The number of 1-byte registers to which data is written corresponds to the number of bytes of write data. Each write selector 304, which operates during writing of data, selects 1 byte to be written in the corresponding 1-byte register, among the input 1, 2, or 4 bytes of data. The write enable control logic 311 enables data to be written only in one, two, or four 1-byte registers to which the data is to be written. As a result, data is written only in the enabled 1-byte registers. The write pointer increasing unit 310 adds the number of bytes of the written data to a value of the write pointer 309.

In the case where data is read from the FIFO device 300, the read selector 305 selects data corresponding to the number of bytes to be read, among the data input from each 1-byte register. The leading 1-byte register selected by the read selector 305 is determined based on a value held by the read pointer 307. A value of each of the selected 1-byte registers is transferred using the read data bus 302. The read pointer increasing unit 308 adds the number of bytes of the read data to a value of the read pointer 307.

The byte register 303 has a ring buffer structure. More specifically, a 1-byte register 31 and a 1-byte register 0 are assumed to be adjacent to each other. Therefore, the byte register 303 does not include a 1-byte byte register at an end position. A data read position on the byte register 303 is indicated by the read pointer 307. Similarly, a data write position is indicated by the write pointer 309. Values of the read pointer 307 and the write pointer 309 are calculated modulo 32. More specifically, the read pointer 307 and the write pointer 309 can take values from 0 to 31. In the case where no data is accumulated in the byte register 303, a value of the read pointer 307 matches with that of the write pointer 309. In the case where data is accumulated in the byte register 303, a value of the read pointer 307 is different from that of the write pointer 309.

In the case where a value of the write pointer 309 exceeds a value of the read pointer 307 by writing data in the FIFO device 300, the overflow/underflow detector 306 detects a FIFO overflow. In the case where a value of the read pointer 307 exceeds a value of the write pointer 309 by reading data from the FIFO device 300, the overflow/underflow detector 306 detects a FIFO underflow. During the FIFO overflow/underflow detection, reading/writing of data with respect to the FIFO device 300 is limited.

As described above, reading/writing of 1, 2, or 4 bytes of data is performed with respect to the FIFO device 300. In the FIFO device 300, the write selector 304 is required for each 1-byte register. Therefore, in the case where the FIFO device 300 is mounted on a chip, the circuit area of the FIFO device on the chip increases.

As described above, the conventional FIFO device having a function of transferring data of a plurality of word lengths includes a shift register in which minimum write unit registers are connected to each other, so that a write control logic circuit is required for each minimum write unit register. Therefore, as the size of the shift register becomes larger, the size of the required write control logic circuit increases. As a result, the size of the circuit of the entire FIFO device increases, and the circuit area in the case of mounting the FIFO device on a chip increases. Furthermore, the increase in circuit area leads to an increase in system cost.

SUMMARY OF THE INVENTION

A FIFO memory device for inputting/outputting data having variable lengths of the present invention, includes: a first holding portion for holding data having a maximum data length MAX of input data to be input to the FIFO memory device; a second holding portion for holding residue data having a data length shorter than the maximum data length; and an input selecting portion for selectively inputting the input data to the first holding portion and the second holding portion in accordance with a data length IBP of the residue data and a data length WB of the input data.

In one embodiment of the present invention, in a case of IBP+WB≧MAX, the input selecting portion inputs the residue data to the first holding portion ahead of the input data in such a manner that a data length of data to be input to the first holding portion becomes equal to the maximum data length MAX and inputs data among the input data, which has not been input to the first holding portion, to the second holding portion, and in a case of IBP+WB<MAX, the input selecting portion inputs the input data to the second holding portion.

In another embodiment of the present invention, the input selecting portion includes an input selector, a shift-in selector, and a control portion, the input selector selectively inputs the input data to the shift-in selector and the second holding portion, the shift-in selector selectively inputs the input data and the residue data held by the second holding portion to the first holding portion, and the control portion controls the input selector and the shift-in selector.

In another embodiment of the present invention, the above-mentioned FIFO memory device further includes a third holding portion for holding a data length of the residue data held by the second holding portion.

Thus, the invention described herein makes possible the advantage of providing a FIFO device having a control structure suitable for a maximum data length of write data, in which a structure of a write control logic circuit is simplified and the circuit size of the entire FIFO device is decreased.

This and other advantages of the present invention will become apparent to those skilled in the art upon reading and understanding the following detailed description with reference to the accompanying figures.

BRIEF DESCRIPTION OF THE DRAWINGS

FIG. 3 is a diagram showing a first exemplary configuration of a conventional FIFO device.

FIG. 4 is a diagram showing a second exemplary configuration of the conventional FIFO device.

DESCRIPTION OF THE PREFERRED EMBODIMENTS

Figure 1:
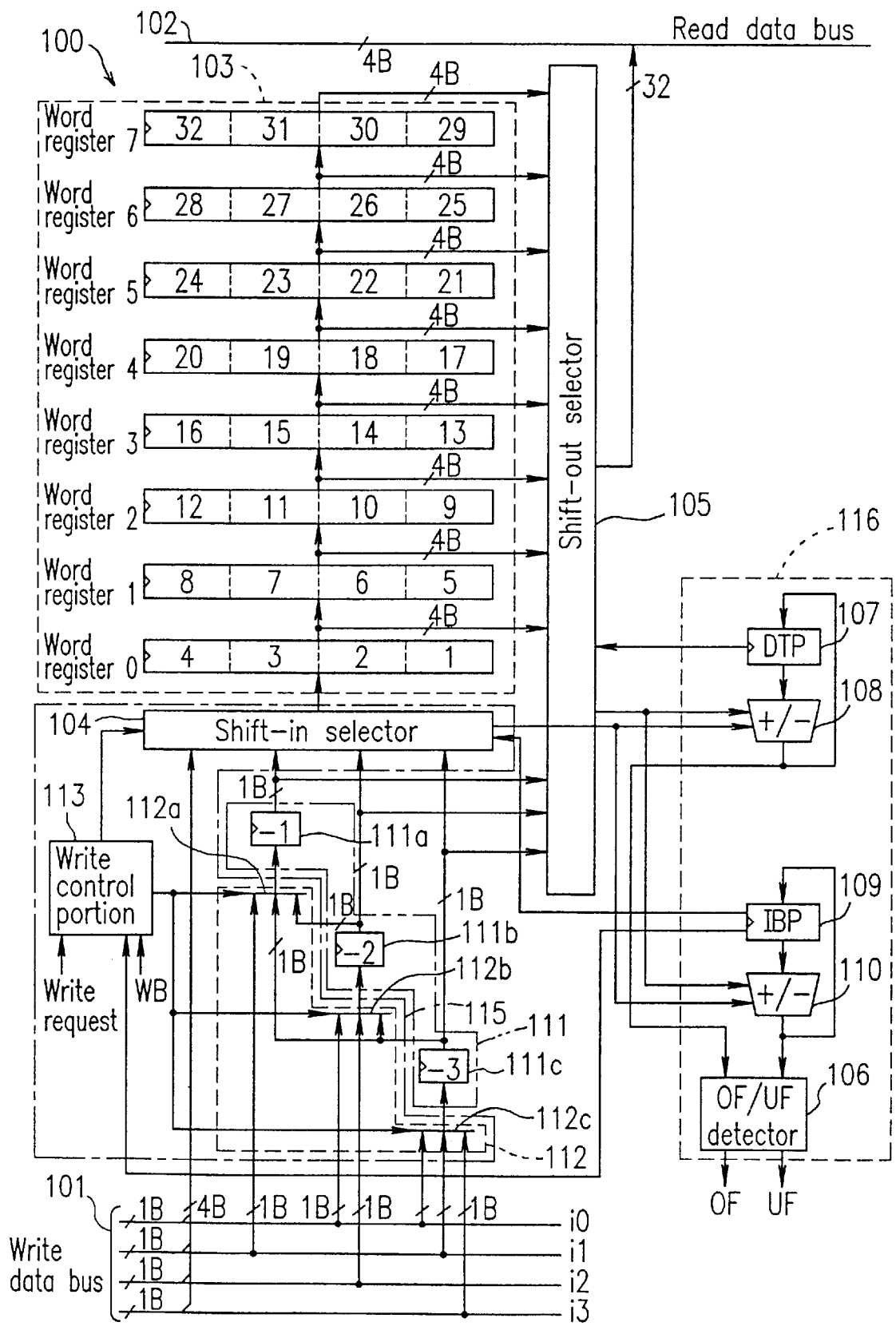
FIG. 1 is a diagram showing an exemplary configuration of a FIFO device according to the present invention.

FIG. 1 shows a configuration of a FIFO device 100 according to the present invention. A data length of data to be read from or written to the FIFO device 100 at a time is variable.

The FIFO device 100 includes a first holding portion 103, a second holding portion 111, and an input selecting portion 115. The first holding portion 103 holds data having the maximum data length of data to be input to the FIFO device 100. The second holding portion 111 holds residue data having a data length shorter than the maximum data length of the data to be input to the FIFO device 100. The input selecting portion 115 selectively inputs the input data to the first holding portion 103 and the second holding portion 111 in accordance with data lengths of the residue data and those of the input data.

The FIFO device 100 further includes a state administering portion 116. The state administering portion 116 holds the data lengths of the input data and those of the residue data. The data held by the state administering portion 116 is referred to for the operation of the input selecting portion 115 and the shift-out selector 105.

The FIFO device 100 further includes a shift-out selector 105 as a logic circuit for reading data. The shift-out selector 105 selects data to be read from the first holding portion 103 and the second holding portion 111.

The FIFO device 100 is connected to a write data bus 101 and a read data bus 102. The write data bus 101 and the read data bus 103 have the maximum data length of the input data, respectively. The write data bus 101 is used for transferring data to be written in the FIFO device 100. The read data bus 102 is used for transferring data to be read from the FIFO device 100.

The first holding portion 103 is a main body of the FIFO buffer memory. The first holding portion 103 is a shift register in which 8 word registers 0 to 7 are connected in series to each other. The length of each word register is the maximum data length to be written in the FIFO device 100. In the first holding portion 103, data is first input to the word register 0. The data input in the word register 0 is shifted successively up to the word register 7 by a shift-operation of the first holding portion 103.

The second holding portion 111 includes input buffers 111a, 111b, and 111c. Each length of the input buffers 111a, 111b, and 111c is the minimum data length to be written in the FIFO device 100. The input buffers 111a, 111b, and 111c temporarily hold residue data before being written in the first holding portion 103.

The input selecting portion 115 includes a buffer input selector 112, a shift-in selector 104, and a write control portion 113. The buffer input selector 112 selectively inputs write data to the second holding portion 111 and the shift-in selector 104. The shift-in selector 104 is a logic circuit for aligning the data to be written in the first holding portion 103 with the maximum data length to be written in the FIFO device 100. The write control portion 113 controls the operations of the shift-in selector 104 and the -buffer input selector 112 in accordance with a write requesting signal input from outside, a write data length, and a value of the input buffer pointer 109.

Figure 2:
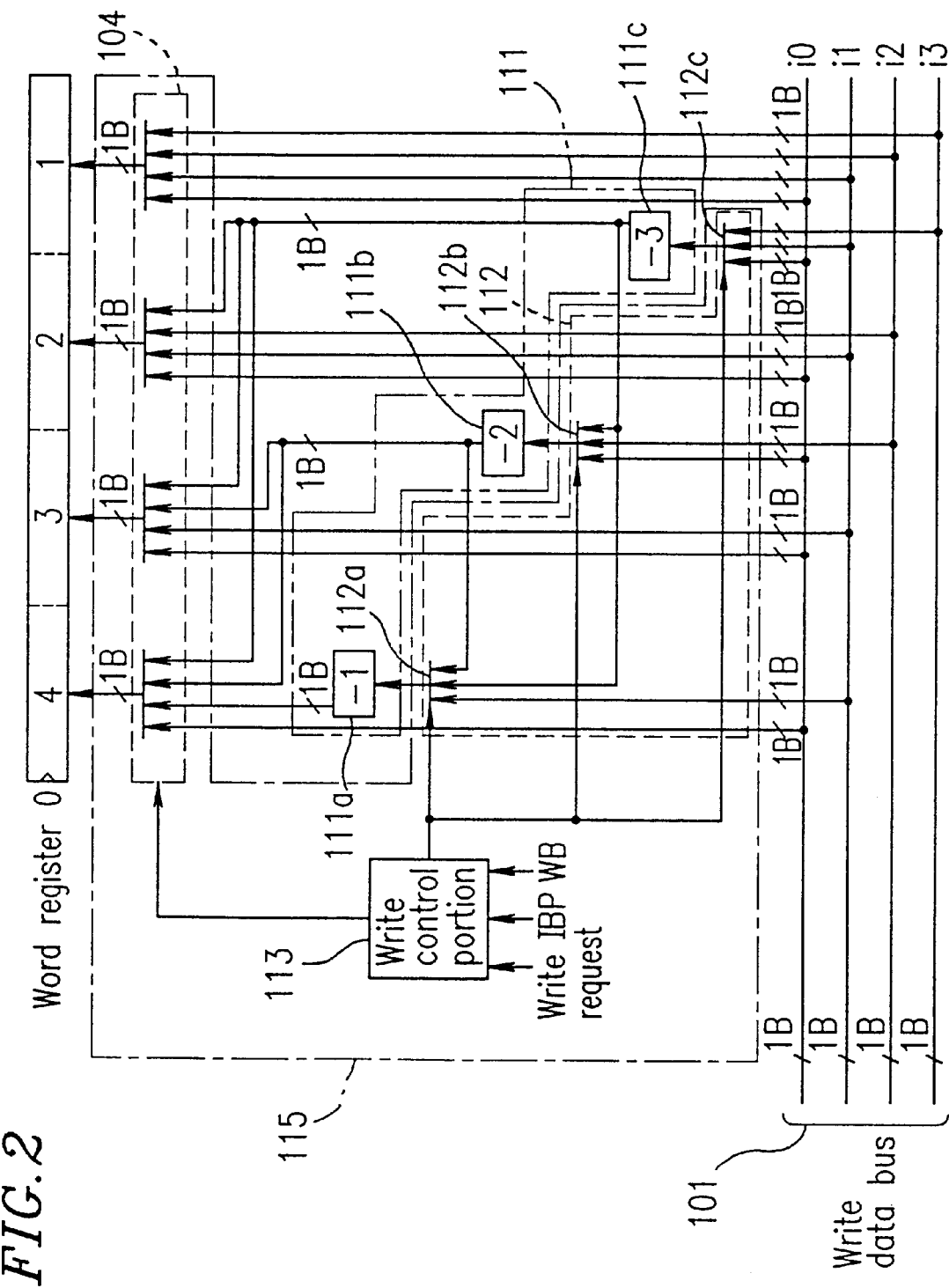
FIG. 2 is a diagram showing an exemplary detailed circuit configuration of an input selecting portion included in the FIFO device according to the present invention.

FIG. 2 shows a detailed exemplary circuit configuration of the input selecting portion 115. In FIG. 2, the minimum unit of data to be written in the FIFO device 100 is 1 byte. The maximum data length of data to be written in the FIFO device 100 at a time is 4 bytes. It is shown in FIG. 2 to which register each byte data on the write data bus 101 is transferred.

The buffer input selector 112 includes write selectors 112a, 112b, and 112c. The write selector 112a corresponds to an input buffer 111a, the write selector 112b corresponds to an input buffer 111b, and the write selector 112c corresponds to an input buffer 111c. The write selector 112a selects data to be written in the corresponding input buffer 111a from the input data in accordance with a control signal from the write control portion 113. Similarly, the write selector 112b selects data to be written in the input buffer 111b in accordance with a control signal from the write control portion 113. The write selector 112c selects data to be written in the input buffer 111c in accordance with a control signal from the write control portion 113.

The state administering portion 116 includes an overflow/underflow detector 106, a data top pointer 107, a data top pointer increasing/decreasing unit 108, an input buffer pointer 109, and an input buffer pointer increasing/decreasing unit 110. The overflow/underflow detector 106 is a logic circuit for detecting a FIFO overflow and a FIFO underflow. The data top pointer 107 indicates the leading register in which data is stored in the first holding portion 103. A value of the data top pointer 107 is equal to the number of bytes of data stored in the first holding portion 103. The data top pointer increasing/decreasing unit 108 is an operator for increasing/decreasing a value of the data top pointer 107. The input buffer pointer 109 indicates the number of bytes of data stored in the second holding portion 111. The input buffer pointer increasing/decreasing unit 110 is an operator for increasing/decreasing a value of the input buffer pointer 109.

Hereinafter, an operation of the FIFO device 100 will be described with reference to FIG. 1. In the following description, it is assumed that the data length of data to be read from/written in the FIFO device 100 at a time is 1, 2, or 4 bytes. Furthermore, it is assumed that the minimum unit of data to be read to/written in the FIFO device 100 is 1 byte.

Table 2 shows an operation in the case where 1, 2, or 4 bytes of data are written in the FIFO device 100. The operation shown in Table 2 is realized when the write control portion 113 controls the operation of the shift-in selector 104 and the operation of the buffer input selector 112. In Table 2, IBP indicates a value of the input buffer pointer 109 (i.e., the number of bytes of data stored in the second holding portion 111). WB indicates the number of bytes to be written in the FIFO device 100. i0, i1, i2, and i3 indicate each byte of the write data. Similarly, b1, b2, and b3 indicate 1 byte of data held by the input buffers 111a, 111b, and 111c before writing. IB1, IB2, and IB3 indicate data held by the input buffers 111a, 111b, and 111c, respectively. { } indicates a series of data. The symbol—in the data indicates that there is no corresponding data. The left side of Table 2 shows the value IBP of the input buffer pointer 109 before writing, the number of bytes WB of write data, and the content of the write data. In the write data in { }, data on the right side is written first. The right side of Table 2 shows the value IBP of the input buffer pointer 109 after writing, the contents of the input buffers 111a, 111b, and 111c, the content of the word register 0, and the presence of the shift-in operation at a time of writing.

indicates a residue system. The shift-in logic SIL is represented by Expression 1:

$$SIL=(IBP+WB \geq 4) \qquad (1)$$

The value DTP of the data top pointer after writing is represented, using DTP before writing, by Expression 2:

$$DTP=DTP+4 \times SIL \qquad (2)$$

The value IBP of the input buffer pointer after writing is represented, using IBP before writing, by Expression 3:

TABLE 2

Writing in a FIFO device

| Before writing | | | After writing | | | |
|---|---|---|---|---|---|---|
| IBP | WB | Write data | IBP | {IB1, IB2, IB3} | Word register 0 | Shift-in |
| 0 | 1 | {i0} | 1 | {—, —, i0} | Hold | No |
| 0 | 2 | {i1, i0} | 2 | {—, i0, i1} | Hold | No |
| 0 | 4 | {i3, i2, i1, i0} | 0 | {—, —, —} | {i0, i1, i2, i3} | Yes |
| 1 | 1 | {i0} | 2 | {—, b3, i0} | Hold | No |
| 1 | 2 | {i1, i0} | 5 | {b3, i0, i1} | Hold | No |
| 1 | 4 | {i3, i2, i1, i0} | 1 | {—, —, i3} | {b3, i0, i1, i2} | Yes |
| 2 | 1 | {i0} | 5 | {b2, b3, i0} | Hold | No |
| 2 | 2 | {i1, i0} | 0 | {—, —, —} | {b2, b3, i0, i1} | Yes |
| 2 | 4 | {i3, i2, i1, i0} | 2 | {—, i2, i3} | {b2, b3, i0, i1} | Yes |
| 5 | 1 | {i0} | 0 | {—, —, —} | {b1, b2, b3, i0} | Yes |
| 5 | 2 | {i1, i0} | 1 | {—, —, i1} | {b1, b2, b3, i0} | Yes |
| 5 | 4 | {i3, i2, i1, i0} | 5 | {i1, i2, i3} | {b1, b2, b3, i0} | Yes |

Here, the shift-in operation of the first holding portion 103 refers to the operation of shifting the entire first holding portion 103 and adding the maximum data length (e.g., 4) to a value of the data top pointer 107. Shifting the entire first holding portion 103 refers to shifting the contents of the word registers upward. For example, the content of the word register 1 is input to the word register 2, and the content of the word register 0 is input to the word register 1. As described above, the operation of adding the maximum data length to a value of the data top pointer 107 is performed by the data top pointer increasing/decreasing unit 108.

Each element on the right side of Table 2 is determined depending upon each element on the left side of Table 2. More specifically, in the case where the sum of the number of bytes of write data and the value held by the input buffer pointer 109 is equal to or more than 4, which is the maximum data length of the write data, data is written in the word register 0 after the shift-in operation is performed. The data held by the second holding portion 111 is written in the word register 0 ahead of the write data in such a manner that the data length of the data to be written in the word register 0 becomes equal to the maximum data length. Data which has not been written in the word register 0 is written in the second holding portion 111.

In the case where the sum of the number of bytes of the write data and the value held by the input buffer pointer 109 is less than 4, the write data is written in the second holding portion 111. In this case, data is not written in the word register 0, and the shift-in operation is not performed.

The operation of writing 1, 2, or 4 bytes of data in the FIFO device 100 can be represented by the following expressions. It is assumed that a shift-in logic is SIL, a value of the data top pointer is DTP, a value of the input buffer pointer is IBP, and the number of bytes of the write data is WB. It is also assumed that a value of a conditional expression in parentheses is 1 when the expression holds, and the value is 0 when the expression does not hold. mod $$IBP=(IBP+WB) \bmod 4 \qquad (3)$$

Referring to Table 2, an exemplary operation in the case where 1, 2, or 4 bytes of data are written in the FIFO device 100 will be described. For example, the case where IBP before writing is 0, WB before writing is 2, and write data is {i1,i0} will be considered. In this case, the sum of IBP and WB is less than the maximum data length (=4). Therefore, the write data {i1,i0} is written in the second holding portion 111. Furthermore, the shift-in operation is not performed, and data is not written in the word register 0. IBP after writing becomes 2, {IB1,IB2,IB3}={−,i0,i1}, and the content of the word register 0 is held. Similarly, the case where IBP before writing is 2, WB before writing is 4, and the write data is {i3,i2,i1,i0} will be considered. In this case, the sum of the number of bytes of the write data and the number of bytes of the data held by the second holding portion 111 is the maximum data length (=4) or more. Therefore, the shift-in operation is performed, and the data is written in the word register 0. The data held by the second holding portion 111 is written in the word register 0 ahead of the write data. In this case, the second holding portion 111 holds data {b2,b3 }, so that data {b2,b3} is written in the word register 0 ahead of the write data {i3,i2,i1,i0}. As a result, higher order data {b2,b3,i0,i1} of the data {b2,b3} held by the second holding portion 111 and the write data {i3,i2,i1,i0} is written in the word register 0. The data {i2,i3} which has not been written in the word register 0 among the write data {i3,i2,i1,i0} is written in the second holding portion 111. IBP after writing becomes 2, {IB1,IB2,IB3}={−,i2,i3}, and the content of the word register 0 becomes {b2,b3,i0,i1}.

In the case where a value of the data top pointer 107 exceeds 32 by writing data in the FIFO device 100, the overflow/underflow detector 106 detects a FIFO overflow. The overflow/underflow detector 106 transmits a FIFO overflow signal upon detection of the FIFO over-flow. The generation of the FIFO overflow is informed outside of the FIFO device 100 by the FIFO overflow signal. In the case of the generation of the FIFO overflow, the FIFO device 100 allows the writing in the FIFO device 100 to wait until a sufficient number of void registers are obtained in the first holding portion 103 by reading data.

Next, an operation in the case where 1, 2, or 4 bytes of data are read from the FIFO device 100 will be described. In the case where data is read from the FIFO device 100, 1-byte registers are selected by the shift-out selector 105 in accordance with the number of bytes to be read. The 1-byte register selected by the shift-out selector 105 is placed lower than a position designated by the data top pointer 107. The data of the 1-byte register thus selected is transferred using a lower order side of the read data bus 102. A value of the data top pointer 107 is decreased by 1, 2, or 4 in accordance with the number of bytes of read data.

Even though a value of the data top pointer 107 becomes negative when data is read from the FIFO device 100, as long as a value of the input buffer pointer 109 does not become negative, data is read. More specifically, even though the value of the data top pointer 107 becomes negative, as long as the value of the input buffer pointer 109 does not become negative, an underflow is not generated. In the case where the value of the data top pointer 107 before reading is positive, the data in the second holding portion 111 is read after the data in the first holding portion 103. In the case where the value of the data top pointer 107 has already been negative before reading, data is only read from the second holding portion 111.

In the case where a value of the data top pointer 107 and a value of the input buffer pointer 109 become negative by reading data from the FIFO device 100, the overflow/underflow detector 106 detects a FIFO underflow. The overflow/underflow detector 106 transmits a FIFO underflow signal upon detection of a FIFO underflow. The generation of the FIFO underflow is informed outside of the FIFO device 100 by the FIFO underflow signal. In the case of the generation of the FIFO underflow, the FIFO device 100 allows the reading from the FIFO device 100 to wait until a sufficient number of registers for holding data are obtained in the first holding portion 103 by writing data.

Table 3 shows a read logic from the FIFO device 100. The logic of Table 3 includes an underflow logic. In Table 3, DTP indicates a value of the data top pointer, and RB indicates the number of bytes to be read.

TABLE 3

Read logic from a FIFO device

```
if(DTP-RB<0)
    if(DTP+IBP<RB)
        underflow=1;
    else{
        IBP=IBP-(RB-DTP);
        DTP=0;
        underflow=0;
    }
else{
    IBP=IBP;
    DTP=DTP-RB;
    underflow=0;
}
```

As described above, reading/writing of data having variable lengths with respect to the FIFO device 100 is performed. In the FIFO device 100, three shift paths and a selector are not required for each 1-byte register as in the conventional FIFO device 200. Furthermore, in the FIFO device 100, the write selector 303 and the write enable control logic 311 are not required for each 1-byte register as in the conventional FIFO device 300. Therefore, in the FIFO device 100, a logic circuit for writing data is simpler than that of the conventional FIFO device.

The operation of the FIFO device 100 according to the present invention is not limited to the above-mentioned example. For example, the FIFO device 100 can be designed in such a manner that the whole write data is written in the word register 0 in the case where a data length of the write data is the maximum data length. Hereinafter, an operation of the FIFO device 100 in this case will be briefly described. The operation of the FIFO device 100 in the case where the data length of the write data is not the maximum data length is similar to that of the FIFO device 100 as described above. In the case where the data length of the write data is the maximum data length, and data held by the second holding portion 111 is present, the shift-in operation is performed, and the data held by the second holding portion 111 is written in the word register 0. Next, the shift-in operation is performed again, and the write data is written in the word register 0. As a result, the write data is written in the word register 0, and the data held by the second holding portion 111 is written in the word register 1. Therefore, the word register 1 includes a portion which is not used. In the case where the data length of the write data is the maximum data length, and there is no data held by the second holding portion 111, the shift-in operation is performed, and the write data is written in the word register 0. In the FIFO device 100, each of the word registers 0 to 7 may include a portion which is not used. Therefore, by separately providing a register for holding the data length of the data stored in each of the word registers 0 to 7 in the state administering portion 116, the use state of the word registers 0 to 7 can be administered. The shift-out selector 105 performs an operation of reading data with reference to the register.

In the above-mentioned example, the case where the data length of the data to be read from/written in the FIFO device at a time is 1, 2, or 4 bytes has been described. According to the present invention, the FIFO device can have a structure in which 3 bytes of data can be read/written at a time. In this case, the content of the write control portion should be altered, and the wiring should be made compatible. Furthermore, in the above example, the case where the maximum data length of the write data is 4 bytes has been described. However, the present invention is also applicable to the case where the maximum length of the write data exceeds 4 bytes. Furthermore, in the case where the maximum length of the write data exceeds 4 bytes, the word registers in the shift register, the input selecting portion, the input buffer, and the wiring should be made compatible.

According to the present invention, a FIFO memory device for inputting/outputting variable data is provided, which includes a first holding portion for holding data having the maximum data length of input data to be input to the FIFO memory device; a second holding portion for holding residue data having a data length shorter than the maximum data length; an input selecting portion for selectively inputting the input data to the first holding portion and the second holding portion, in accordance with the data lengths of the residue data and the input data. As a result, the structure of the input selecting portion in the FIFO memory device becomes simple, and the circuit size of the input selecting portion is reduced. Thus, the circuit size of the entire FIFO memory device is reduced, and the circuit area in the case of mounting the FIFO device on a chip is reduced, whereby system cost can be decreased.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A First-In First-Out (FIFO) memory device for inputting/outputting data having variable lengths, comprising:

a first holding portion for holding data having a maximum data length of input data (MAX);

a second holding portion for holding residue data having a data length shorter than MAX to be input to the first holding portion; and an input selecting portion which selectively inputs the input data to the first holding portion and the second holding portion in accordance with a data length of the residue data corresponding to a number of bytes of residue data stored in the second holding portion ($N_{RES}$) and a data length of the input data corresponding to a number of bytes of input data to be input to the FIFO memory device ($N_{INP}$), wherein when both the input data and the data in the second holding portion are to be written to the first holding portion, data in the second holding portion is written to the first holding portion ahead of the input data.

2. A FIFO memory device according to claim 1, wherein in a case of $N_{RES}+N_{INP} \geq MAX$, the input selecting portion inputs the residue data to the first holding portion ahead of the input data in such a manner that a data length of data to be input to the first holding portion becomes equal to MAX and inputs data among the input data which has not been input to the first holding portion to the second holding portion, and in a case of $N_{RES}+N_{INP}<MAX$, the input selecting portion inputs the input data to the second holding portion.

3. A FIFO memory device according to claim 1, wherein the input selecting portion includes an input selector, a shift-in selector, and a control portion, the input selector selectively inputs the input data to the shift-in selector and the second holding portion, the shift-in selector selectively inputs the input data and the residue data held by the second holding portion to the first holding portion, and the control portion controls the input selector and the shift-in selector.

4. A FIFO memory device according to claim 1, further comprising a third holding portion for holding a data length of the residue data held by the second holding portion.

* * * * *

UNITED STATES PATENT AND TRADEMARK OFFICE
CERTIFICATE OF CORRECTION

PATENT NO. : 6,442,646 B1
DATED : August 27, 2002
INVENTOR(S) : Hideyo Tsuruta

It is certified that error appears in the above-identified patent and that said Letters Patent is hereby corrected as shown below:

<u>Title page,</u>
Item [56], the following references are to be added under the "References Cited":

```
-- 4,271,480 A   6/1981  Vinot            712/300
   4,523,276 A   6/1985  Maejima et al.   711/100
   4,667,305 A   5/1987  Dill et al.      710/127
   5,214,642 A   5/1993  Kunimoto et al.  340/471 --
```

Signed and Sealed this

Eighteenth Day of February, 2003

JAMES E. ROGAN
*Director of the United States Patent and Trademark Office*